United States Patent [19]
Stahl et al.

[11] 3,941,701
[45] Mar. 2, 1976

[54] APPARATUS FOR CONTINUOUS DEWATERING OF AQUEOUS SUSPENSIONS

[75] Inventors: Ulrich Stahl, Tutzing; Oswald Busse, Aarbergen; Hugo Klesper, Aarbergen; Werner Junker, Aarbergen, all of Germany

[73] Assignee: Passavant-Werke Michelbacher Huette, Germany

[22] Filed: Aug. 29, 1974

[21] Appl. No.: 501,649

[30] Foreign Application Priority Data

Oct. 15, 1973 Germany............... 7338316[U]

[52] U.S. Cl. ............ 210/386; 210/401; 210/418
[51] Int. Cl.² ........................................ B01D 33/04
[58] Field of Search ............ 100/110, 116, 118–120, 100/151–154; 198/193; 210/77, 386, 387, 400, 401, 406, 418

[56] References Cited
UNITED STATES PATENTS

| | | | |
|---|---|---|---|
| 1,958,279 | 5/1934 | Morgan............................ | 210/400 X |
| 2,349,080 | 5/1944 | Deck................................. | 100/151 X |
| 3,049,236 | 8/1962 | DeLara et al...................... | 210/77 X |
| 3,477,583 | 11/1969 | Krynski et al..................... | 210/401 |
| 3,537,584 | 11/1970 | MacDonald ..................... | 210/400 X |
| 3,677,411 | 7/1972 | Ishigaki............................ | 210/401 X |
| 3,770,626 | 11/1973 | Ayers................................ | 210/400 X |
| 3,821,928 | 7/1974 | Sugita .............................. | 210/386 X |

*Primary Examiner*—Charles N. Hart
*Assistant Examiner*—Robert H. Spitzer
*Attorney, Agent, or Firm*—Woodford R. Thompson, Jr.

[57] ABSTRACT

The upper flight of an endless filter belt is supported by a backing sheet as it passes through a feeding and initial partial dewatering zone. The upper flight of the filter belt then passes through a main dewatering zone while being subjected to pressure in a direction to force liquid therethrough. Drainage slots in the upper surface of the backing sheet extend at an angle to the direction of travel of the upper flight and leave narrow strips between adjacent slots which engage the under surface of the upper flight.

4 Claims, 4 Drawing Figures

APPARATUS FOR CONTINUOUS DEWATERING OF AQUEOUS SUSPENSIONS

BACKGROUND OF THE INVENTION

This invention relates to apparatus for the continuous dewatering of aqueous suspensions such as slurries and sludges resulting from the purification of waste water.

Recently, filter belts running over a number of guide rolls similar to those employed in paper production have been employed in sludge dewatering systems. Such belts pass through two different zones; a feeding and initial partial dewatering zone and a main dewatering zone. At the initial dewatering zone, the aqueous liquid passing through the filter medium leaves a more or less solid filter cake on the belt which is further dewatered by compression and/or a wicking action whereby the final product has a higher content of solids and a reduced residual moisture level.

Heretofore, difficulties have been encountered in dewatering the slurry sufficiently in the initial partial dewatering zone to form a firm layer of solids which will not give way under the pressure exerted thereon in the main dewatering zone. One attempt to solve this problem has been to extend the initial dewatering zone so that its length equals that of the main dewatering zone. However, this requires an increase in space and is expensive. Another attempt to solve the problem has been to make the unit more compact by positioning one dewatering zone over another so that initial dewatering takes place on the upper flight of an upper, endless belt. The partially dewatered sludge then passes into the main dewatering zone where it is pressed between the lower flight of the upper endless belt and a main filter belt to form a filter cake layer. While this apparatus is compact it offers no solution as far as the cost of equipment is concerned.

Another form of prior art dewatering apparatus consists of two zones arranged in alignment with each other with the feeding and initial dewatering zone of the belt rising sharply and forming one wall of a slurry collecting tank. The front wall of the collecting tank has an inlet for introducing the suspension. While the long retention time in the collecting tank and the increased hydrostatic head prevailing therein will increase the dewatering efficiency of the initial dewatering zone, difficulties are encountered in providing an effective seal where the outer surfaces of the belt move adjacent the walls of the collecting tank. That is, to provide an effective seal, the belt is susceptible to excessive wear whereby it has only a short service life.

SUMMARY OF THE INVENTION

In accordance with our invention we overcome the above difficulties providing apparatus which, not only is comparatively low in cost, but also offers an increase in dewatering efficiency and a reduction in residual cake moisture.

This is accomplished by providing an endless filter belt having its upper flight passing through a feeding and initial partial dewatering zone while engaging a perforated backing sheet. The upper flight then passes through a main dewatering zone while being exposed to a positive pressure and/or a negative pressure. The backing sheet is provided with grooves, slots or similar passages which extend at an angle to the direction of travel of the belt and in closely spaced relation to one another so as to leave small strips on the backing sheet which support the filter belt. Due to this arrangement the passage of liquid through the sludge layer and the porous filter belt is greatly improved. Also, the friction caused by engagement of the filter belt with the strips extending between the grooves and/or slots serves to overcome the adhesion of liquid to the filter belt. Furthermore, a negative pressure is created at the underside of the filter belt due to movement of the belt over the edges of the strips whereby the liquid flow through the filter belt is further improved. The dewatering rate is improved further by sloping the initial partial dewatering zone and its backing sheet.

DESCRIPTION OF THE DRAWINGS

Apparatus embodying features of our invention is illustrated in the accompanying drawings forming a part of this application in which.

DETAILED DESCRIPTION

Figure 1:
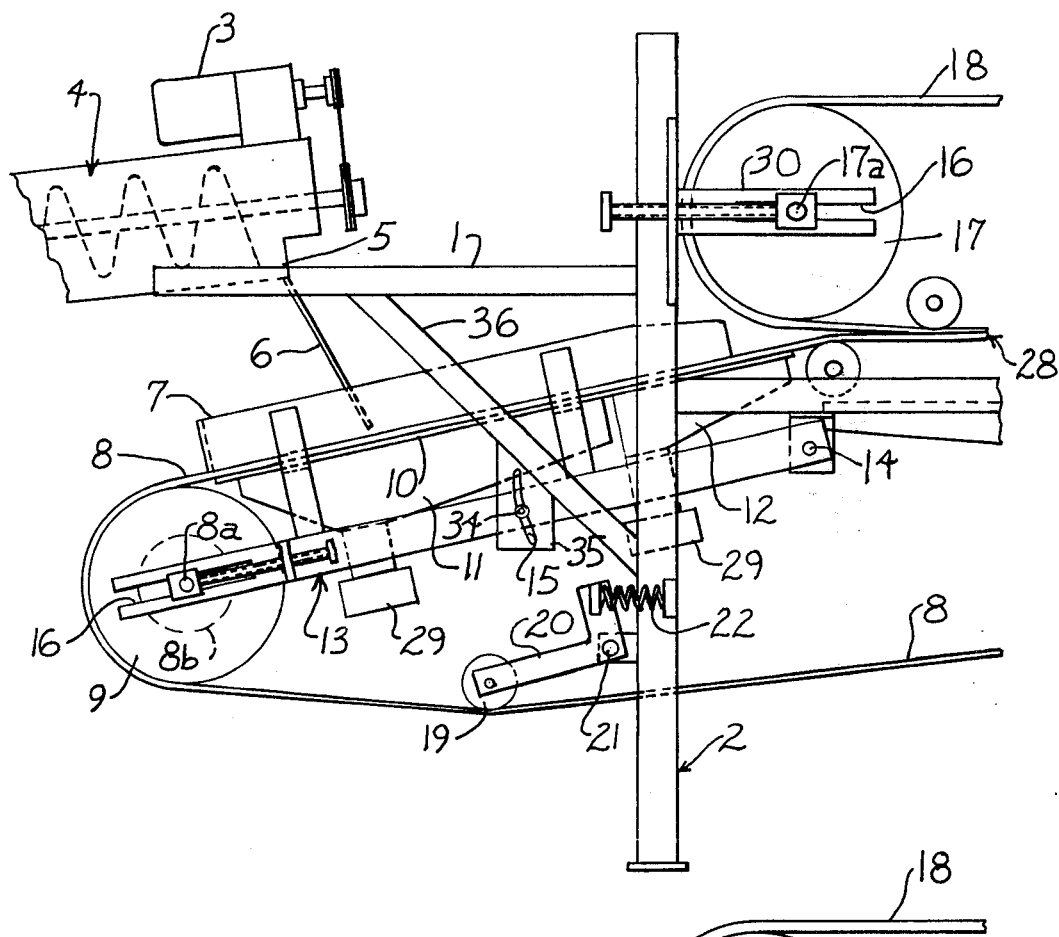
FIG. 1 is a side elevational view, partly broken away, showing the feeding and initial partial dewatering zone and the receiving end of a main dewatering zone.

As shown in FIG. 1, mounted on a cantilever beam 1 of a supporting frame 2 and driven by a geared motor 3 is a feed conveyor 4 having its discharge end 5 communicating with a chute 6. The chute 6 discharges an aqueous suspension into a feeder box 7 having front and side walls which enclose three sides of and defines the initial partial dewatering zone. An endless filter belt 8 runs through this initial dewatering zone to define a bottom therefor and is guided at its head end by means of an adjustable guide roll 9 mounted on a supporting shaft 8a which rides in a guide slot 16 provided in a support frame 13. The filter belt 8 is driven by suitable means such as a motor 8b operatively connected to shaft 8a.

In the initial partial dewatering zone, the under side of the traveling filter belt 8 passes over and engages a backing sheet 10, having the under side thereof communicating with drainage units 11 and 12. All elements associated with the initial partial dewatering zone are carried by the support frame 13 which is pivotally connected at one end to the frame 2 by means of a pivot joint 14. The support frame 13 is inclined upwardly and forwardly, as viewed in the direction of travel of the filter belt 8, and is locked in selected positions by locking bolts 34 which pass through suitable openings in the support frame 13 and an arcuate slot 15 provided in a depending bracket 35 carried by a diagonal brace member 36 in the supporting frame 2. The upper flight of the filter belt 8 and the backing sheet 10 move with the support frame 13 whereby they are also movable to selected inclined positions. The degree of slope ranges from 10° to 25° and preferably 12° to 15° relative to a horizontal plane passing therethrough. This inclination of the upper flight of the feed belt 8 and the backing sheet 10 has the following effect: In the feeder box 7, the heavy solids will quickly settle on the upper surface of the filter belt 8 to be carried off thereon. The supernatant liquid passes through the filter belt 8 countercurrent to the direction of travel of the belt at a velocity slightly greater than that of the filter belt travel. Accordingly, the supernatant liquid invariably passes to areas of the filter belt 8 in which the latter is practically free of solids so as to be easily penetrated by the liquid. To enable the handling of a variety of sludges and solids concentrations, the backing sheet 10 and its front end guide roller 9 are thus adapted to be set at selected inclined positions within the feeding and initial partial dewatering zone. As shown in FIG. 1, the feed chute 6 introduces and retains the suspension at a location in the initial partial dewatering zone which is spaced from the head roll 9. Also the portion of the belt 8 between the feeder box 7 and the head roll 9 is not subjected to pressure. The dewatering efficiency of the apparatus is still further improved by connecting each of the drainage units 11 and 12 provided beneath the backing sheet 10 to a suitable vacuum unit indicated generally at 29 so as to maintain a negative pressure ranging from 15 to 30 mm pressure, water gauge and preferably at 20 mm pressure, water gauge. In actual practice we have found that this pressure is sufficient to considerably increase the dewatering efficiency of the apparatus. Such a vacuum or negative pressure may be obtained by other conventional means well known in the art.

While the slight inclination of the filter belt 8 in the feeding and initial partial dewatering zone facilitates the countercurrent seepage of liquid through the filter media, this effect is further improved where the feeder means through which the aqueous suspension is fed onto the filter belt is spaced from the head end guide roll as described above. Accordingly, there remains a zone intermediate the feeder means and the guide roll 9 which is practically unobstructed by solids suspended in the liquid whereby the liquid can pass freely therethrough. Due to this arrangement, the zone intermediate the feeder means and the guide roll 9 does not have to be connected with the vacuum means, whereby the equipment size and cost may be further reduced.

A guide slot 16a is provided in an arm 30 carried by the frame 2 for receiving the shaft 17a of a head end guide roll 17 that supports an endless compression belt 18 which moves adjacent the upper surface of the filter belt 8 in a main dewatering zone 28.

The frame 2 also supports a tension roller 19 which engages the inner surface of the lower flight of the filter belt 8. The tension roller 19 is carried by an elbow lever 20 which is connected by a pivot joint 21 to the frame 2. A compression spring 22 is interposed between one end of the elbow lever 20 and the frame 2, as shown. Instead of being attached to the frame 2, the tension roller 19 and its support means could be carried by the support frame 13.

Figure 4:
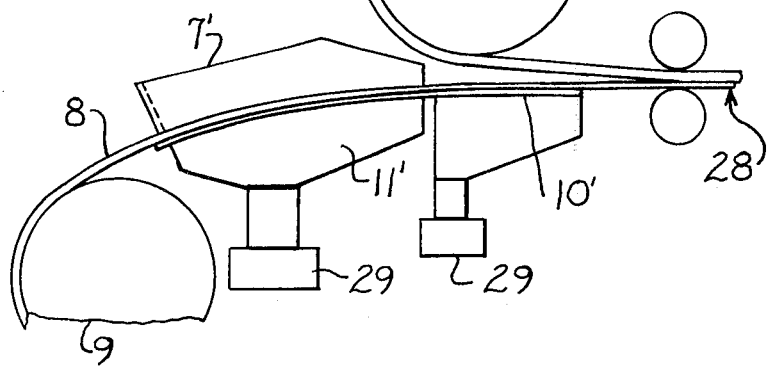

In FIG. 4 we show a modification in which the backing sheet indicated at 10' and the adjacent portion of the filter belt 8 are curved upwardly in the direction of travel of the upper flight of the belt 8 into the feeding and initial partial dewatering zone. The feed box 7' and the drainage unit 11' are shaped correspondingly to this curvature. The curvature is such as to allow the filter belt 8 to merge gradually into the straight and preferably horizontally disposed main dewatering zone 28. Accordingly, the upper surface of the backing sheet and the adjacent portion of the filter belt 8 are convexly curved in the direction of travel of the upper flight of belt 8 and merge into a generally horizontally disposed section. The advantage of this modified configuration is that the pressure at which the filter belt 8 engages the backing sheet remains constant throughout the entire feeding zone, thus enabling the backing sheet to strip off the seepage with optimum efficiency.

Figure 2:
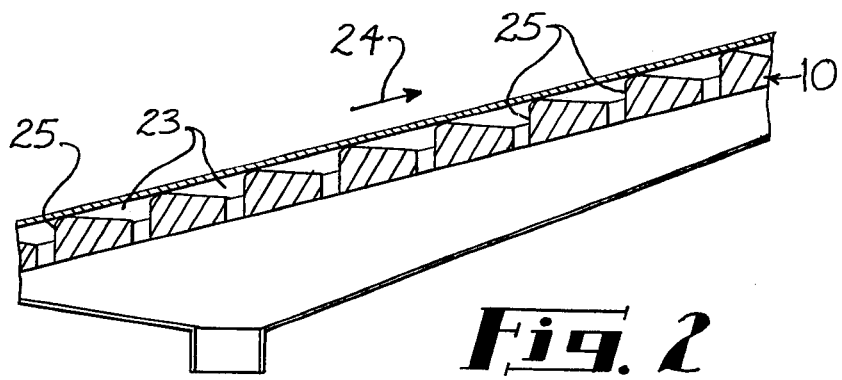
FIG. 2 is a fragmental, vertical sectional view taken through a portion of the initial partial dewatering zone showing a portion of the backing sheet and the filter belt.

As shown in FIg. 2 the backing sheet 10 is provided with a serrated surface defined by drainage slots 23 which are triangular as viewed in cross section and spaced from each other in the direction of travel 24 of the upper flight of the belt 8. The strips 26 remaining between the slots 23 may be slightly convexly rounded at the point of contact with the filter belt 8 in order to reduce undue friction. The object of this design is the following: the steeper wall 25 which is first contacted by the filter belt 8 will wipe the water off the under side of the belt, while a slight vacuum pressure is produced in the wedged or triangular section defined by the steeper wall 25, a generally flat wall 30 and the under surface of the filter belt which will effectively drain the water through the filter belt.

Figure 3:
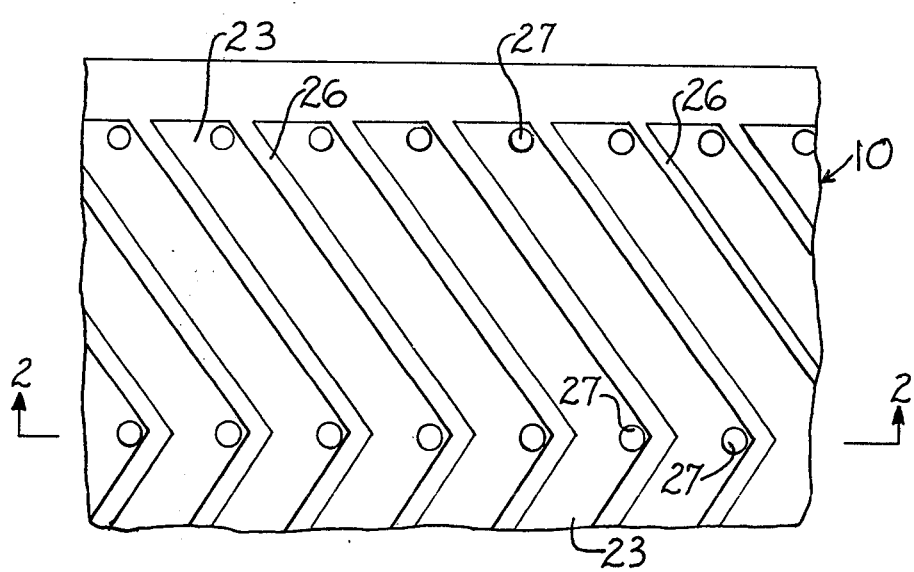
FIG. 3 is a fragmental plan view showing a portion of the backing sheet with the filter belt removed; and, FIG. 4 is a fragmental, side elevational view showing a modified form of the initial partial dewatering zone.

As shown in FIG. 3, the slots 23 extend at an angle or diagonally to the direction of travel 24 of the upper flight of belt 8 and may be generally chevron-shaped or L-shaped. This configuration helps to reduce wear of the filter cloth and results in an outward deflection of the drained water. Where the slots are chevron-shaped the drainage holes 27 for the backing sheet 10 are disposed in the center and at both ends of the grooves or slots 23. The holes 27 may however be more numerous and other distribution or arrangements of such holes 27 may be employed, especially in the feeding zone where major quantities of drainage water may be expected.

The backing sheet 10' shown in FIG. 4 may be made of plastic material whereby the slots 23 and drainage passages 27 are punched out of the plastic sheet prior to its being curved. Consequently, the edges of the resulting ribs or strips 26 will project upwardly relative to the remaining surfaces so as to form a series of wiper edges. Also, the more or less pronounced curvature of the belt 8 and its merging with the horizontal section improves the dewatering performance of the apparatus by facilitating the discharge of large quantities of filtrate while the filter cake adheres to the filter belt 8 as the belt gradually merges in the horizontal section.

While we have shown our invention in but two forms, it will be obvious to those skilled in the art that it is not so limited, but is susceptible of various other changes and modifications without departing from the spirit thereof.

What we claim is:

1. Apparatus for continuously dewatering an aqueous suspension comprising:
   a. an endless filter belt supported for movement with its upper flight passing through a feeding and initial partial dewatering zone and then through a main dewatering zone,
   b. means supplying an aqueous suspension to said upper flight as it passes through said feeding and initial partial dewatering zone,
   c. a backing sheet engaging the under surface of said upper flight while said upper flight is passing relative thereto through said feeding and initial partial dewatering zone and prior to passing through said main dewatering zone,
   d. there being drainage slots in the upper surface of said backing sheet extending at an angle to the direction of travel of said upper flight and spaced from each other to leave narrow strips between adjacent slots which support said upper flight as it passes through said feeding and initial partial dewatering zone, e. means subjecting said upper flight to pressure in a direction to force liquid downwardly therethrough while said upper flight is passing through said main dewatering zone, f. a head roll receiving the end of said filter belt adjacent said feeding and initial partial dewatering zone and operatively connected to said backing sheet and movable therewith, and g. means operatively connected to said head roll to retain said head roll at selected elevations so that said filter belt and backing sheet are movable to selected inclinations within said feeding and initial partial dewatering zone.

2. Apparatus as defined in claim 1 in which each said slot is generally triangular in cross section and the walls of said slot are inclined at different angles with the steeper wall being on the downstream side of the slot as viewed in the direction of travel of said upper flight of said filter belt.

3. Apparatus as defined in claim 1 in which a feed chute retains the suspension in said initial partial dewatering zone and is spaced from said head roll.

4. Apparatus as defined in claim 3 in which a portion of the upper flight of said filter belt between said feed chute and the head roll is not subjected to pressure.

* * * * *